UNITED STATES PATENT OFFICE.

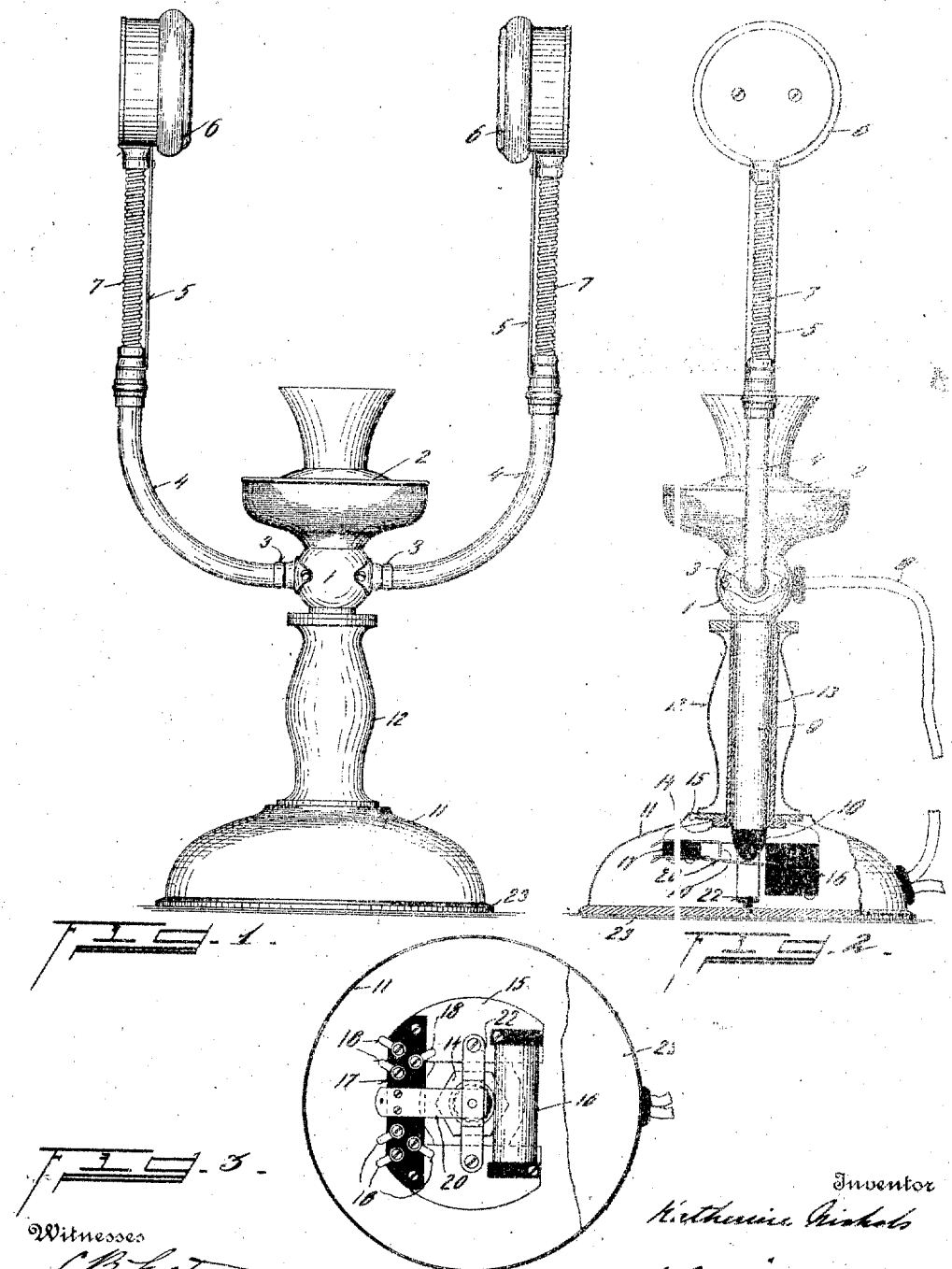

KATHERINE NICHOLS, OF CINCINNATI, OHIO.

TELEPHONE.

1,216,480. Specification of Letters Patent. Patented Feb. 20, 1917.

Application filed April 19, 1915. Serial No. 22,266.

*To all whom it may concern:*

Be it known that I, KATHERINE NICHOLS, a citizen of the United States, and residing at Cincinnati, in the county of Hamilton and State of Ohio, have invented a new and useful Improvement in Telephones, of which the following specification is a full disclosure.

My invention relates to an improvement in a telephonic apparatus, and is particularly directed to a type of instrument having two receivers which are definitely positioned relative to the transmitter and automatically adjustable relative to the ears of the user.

The object of my invention is to provide a telephone instrument which, by the relative positions of the transmitters and receivers, compels the user to talk directly into the transmitter and at the same time prevents personal contact therewith.

Another object is to provide a simple, strong and efficient instrument comprising a pair of receivers and a transmitter combined in a single structural unit removably supported in a base or socket.

A further object is to provide a telephone instrument having a supporting stud combined with a base or socket having a pair of contact plates included in the ringing or signal circuit of the telephone system and controlled by the relative position of the supporting stud.

Another object is to provide a telephone instrument comprising a pair of receivers and a transmitter all supported on a single fitting and forming a single structural unit.

These and many other advantages are afforded by this invention, and are due not only to the specific construction herein shown, but to the broad underlying principles upon which it is based.

All of these features and advantages will be more fully set forth in the description of the accompanying drawings, forming a part of this disclosure, and in such drawings like characters of reference denote corresponding parts throughout the several views, of which:—

Figure 1 is a front elevation.

Fig. 2 is a side elevation partly in section.

Fig. 3 is a bottom plan view.

The transmitting and receiving elements of the instrument are secured to and carried by a single fitting or coupling which is of the general form of an inverted T and will be hereinafter referred to as a T-coupling. This T coupling consists of a hollow spherical body portion 1 having an orifice in its upper side to receive the transmitter 2. Extending outwardly from either side of the body portion 1 are tubular projections 3 in which are secured upwardly curved tubular arms 4 near the upper ends of which are secured leaf springs 5, each supporting a receiver 6. Intermediate the receivers and the arms 4, I provide flexible tubing conduits 7. The normal positions or span of the two receivers is slightly less than a normal head width and the leaf springs 5 tend to hold said receivers comfortably to the ears of the user when the instrument is in use.

The circuit wires from the receivers extend downwardly through the flexible conduits 7 and tubular arms 4 and into the hollow body portion 1 of the T-coupling where they are incorporated, with the transmitter circuit wires, to form a cord 8 which extends through an aperture in said body portion and to the base portion of the instrument. Extending downwardly from the body portion 1 of the T-coupling is an elongated stud 9 having a fiber conical tip 10. The base portion of the apparatus consists of a hollow base 11 and a pedestal 12, which are secured together by a tube 13 and a nut 14, said tube forming a receiving socket for the stud 9. Secured in the base 11 beneath the nut 14 is a plate 15 which serves as a support for a resistance coil 16 and a fiber terminal block 17 having a series of binding screws 18 through which the various electrical connections between the instrument and line wires are made. Secured to the terminal block 17 is a pair of contact plates 19, 20, the plate 20 being elongated to extend across the axial line of the tube 13. These contact plates are included in the ringing or signal circuit and when the instrument is in normal position, as shown, the conical fiber tip 10 of the stud 9 contacts with the lower plate 20 and the weight of the instrument moves it out of contact with its companion contact plate 19, thereby breaking the signal circuit. A metal U-shaped strap 22 is secured at its ends to the plate 15 and to said strap is secured a base-board 23.

While I have shown the supporting stud 9 as being of an elongated form it may be of any desired length or shape or may be a part of one or both of the arms 4.

When it is desired to use the instrument, it is removed from the base and such removal will allow the contact plate 20 to engage the contact plate 19, thereby completing the ringing or signal circuit.

The preferred embodiment of the invention reduces the structure to elemental simplicity, and it is of superior beauty. Not only is the functional efficiency improved, but the convenience of usage is greatly enhanced, the receiving and transmitting instruments comprising a T-unit, combining rigidity and lightness, the lifting or replacing of this unit in its holding socket, automatically controlling the electric connections.

Having described my invention, I claim:

1. A device of the nature disclosed comprising two receivers and a transmitter supported by a single fitting, a stud secured to said fitting, a support for said stud, means within said support for completing the signal circuit of the telephone system functioned by the removal of the stud from the support.

2. A device of the nature disclosed comprising a hollow fitting, a transmitter secured thereto, arms radiating from said fitting, a pair of receivers, spring arms intermediate the receivers and the radiating arms, a stud secured to the fitting, a support apertured to receive the stud, and means within the support for controlling the signal circuit of the telephone system.

3. A device of the nature disclosed comprising a T-coupling, a transmitter secured thereto, arms radiating from said coupling, a pair of receivers, yielding means intermediate the receivers and the arms for definitely positioning said receivers relative to the transverse plane of the transmitter, and to automatically urge them toward the axial line of the transmitter.

4. A device of the class described comprising a base member, a transmitter and a pair of relatively opposite receivers combined as a unit, and as a unit having a stem forming a handle therefor and alternatively a support adapted to be engaged in a socket in said base member.

5. A device of the nature disclosed comprising a base member, a pair of receivers and a transmitter combined as a unit, the transmitter as a base having arms connecting therewith at opposite sides and extending therebeyond in lines parallel with an axial line through the transmitter, and a stem projecting axially from said base in a direction opposite to said arms, providing alternatively a handle for the unit and a coupling for engaging with said base member.

6. In a device of the nature disclosed, a standard constituting a socket support, a T-insert comprising expansible yoked receivers and a medially disposed transmitter, said unit being held by and in swiveled relation to the socket support, and means whereby the making and breaking of contact between said unit and socket appropriately makes or breaks the electric signal circuit.

In witness whereof, I hereunto subscribe my name, as attested by the two subscribing witnesses.

KATHERINE NICHOLS.

Witnesses:
CLARENCE B. FOSTER,
L. A. BECK.